L. R. ROBERTS.
AUTOMATIC TYPE WRITER OPERATOR.
APPLICATION FILED JUNE 6, 1916.

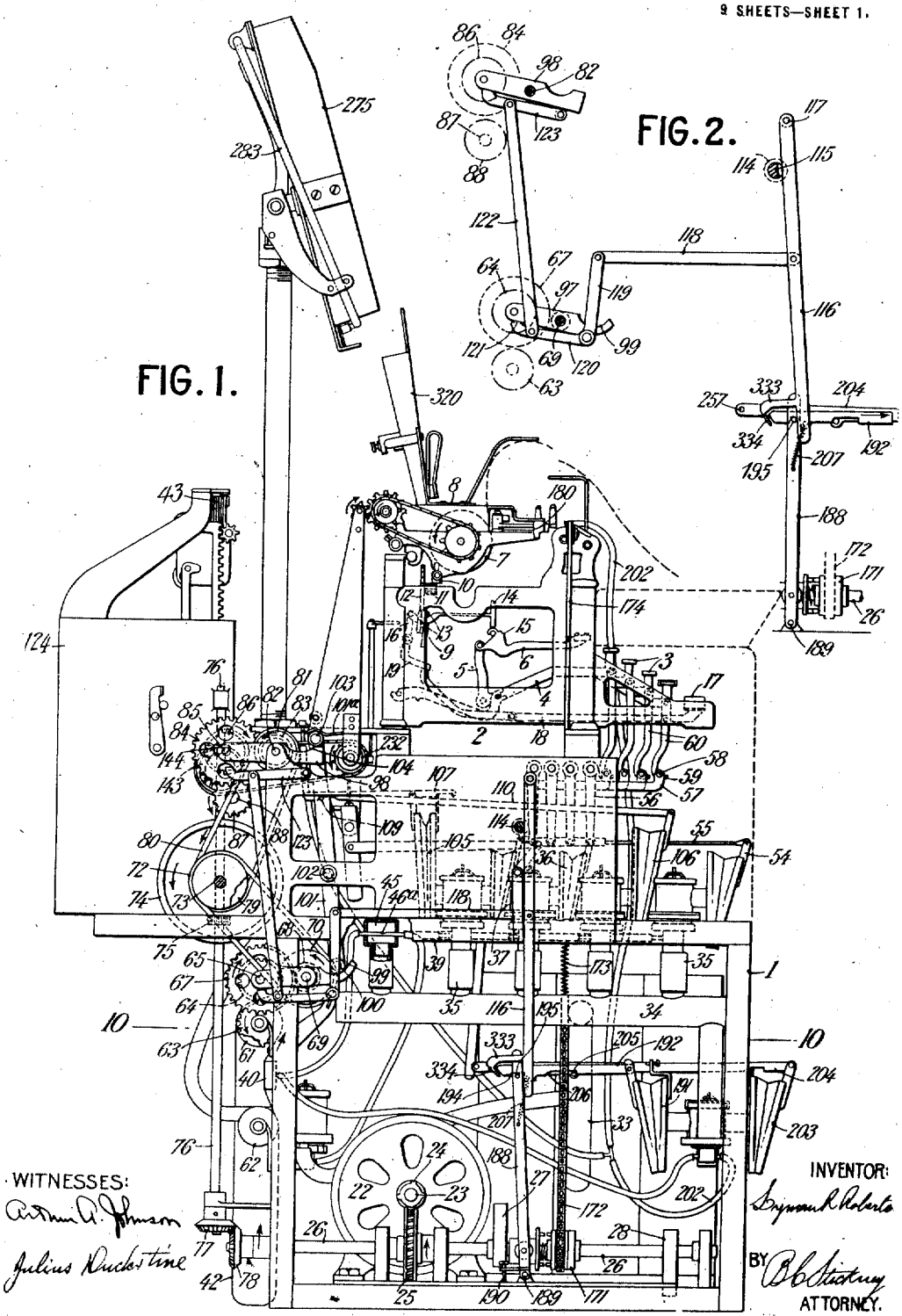

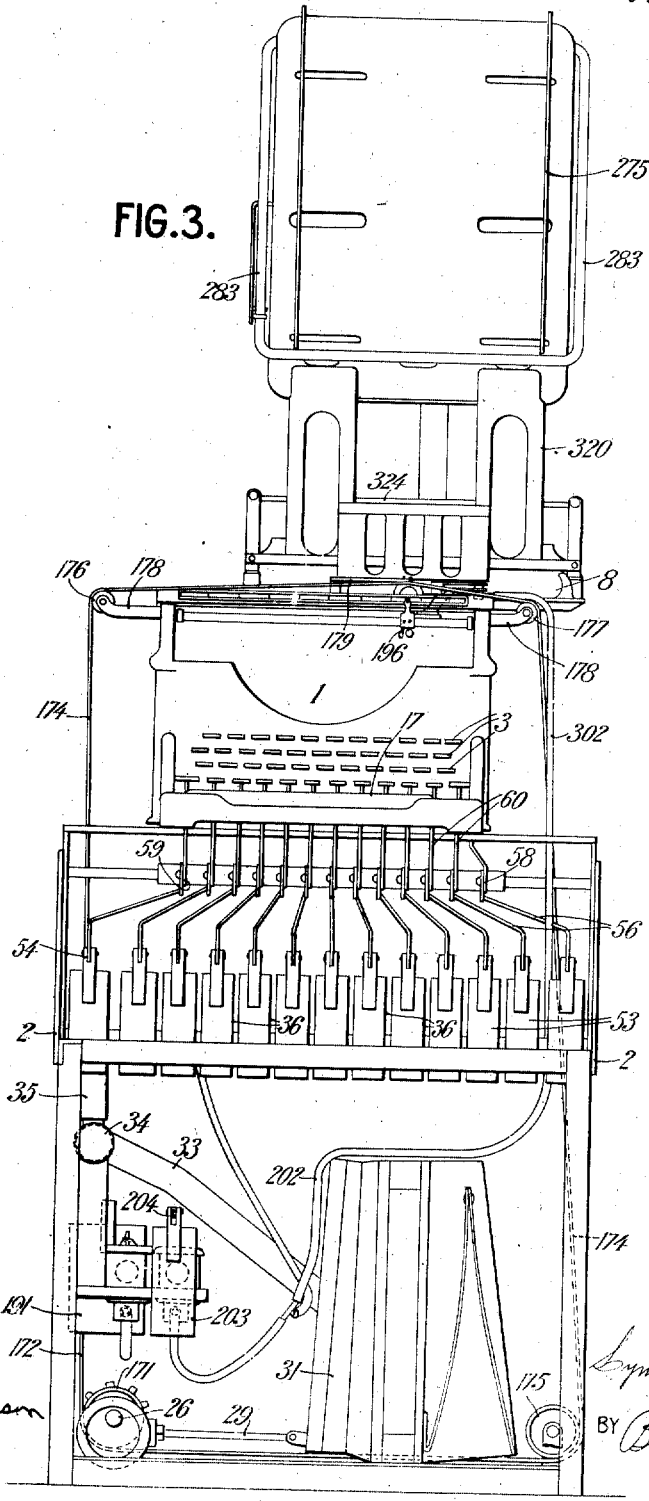

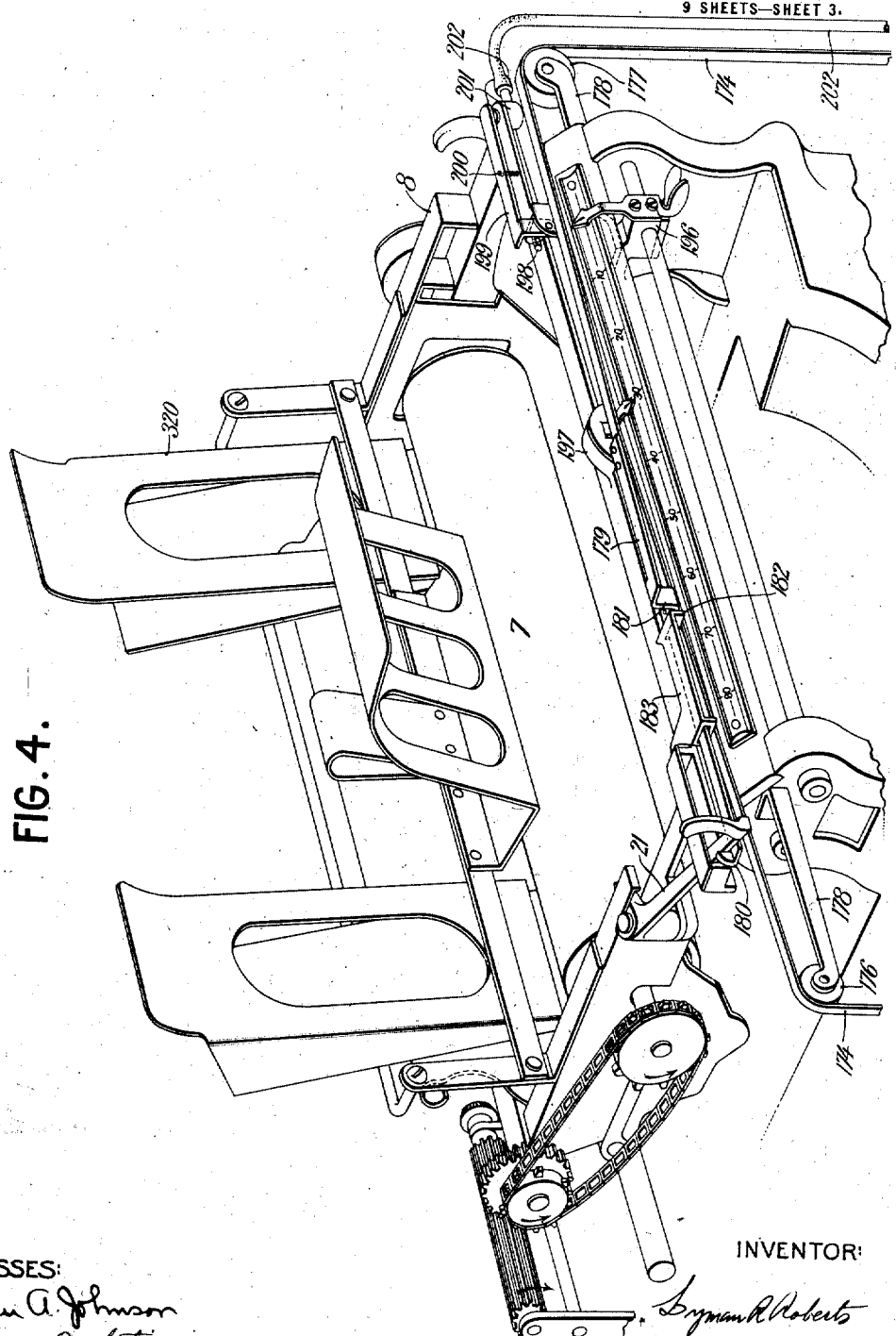

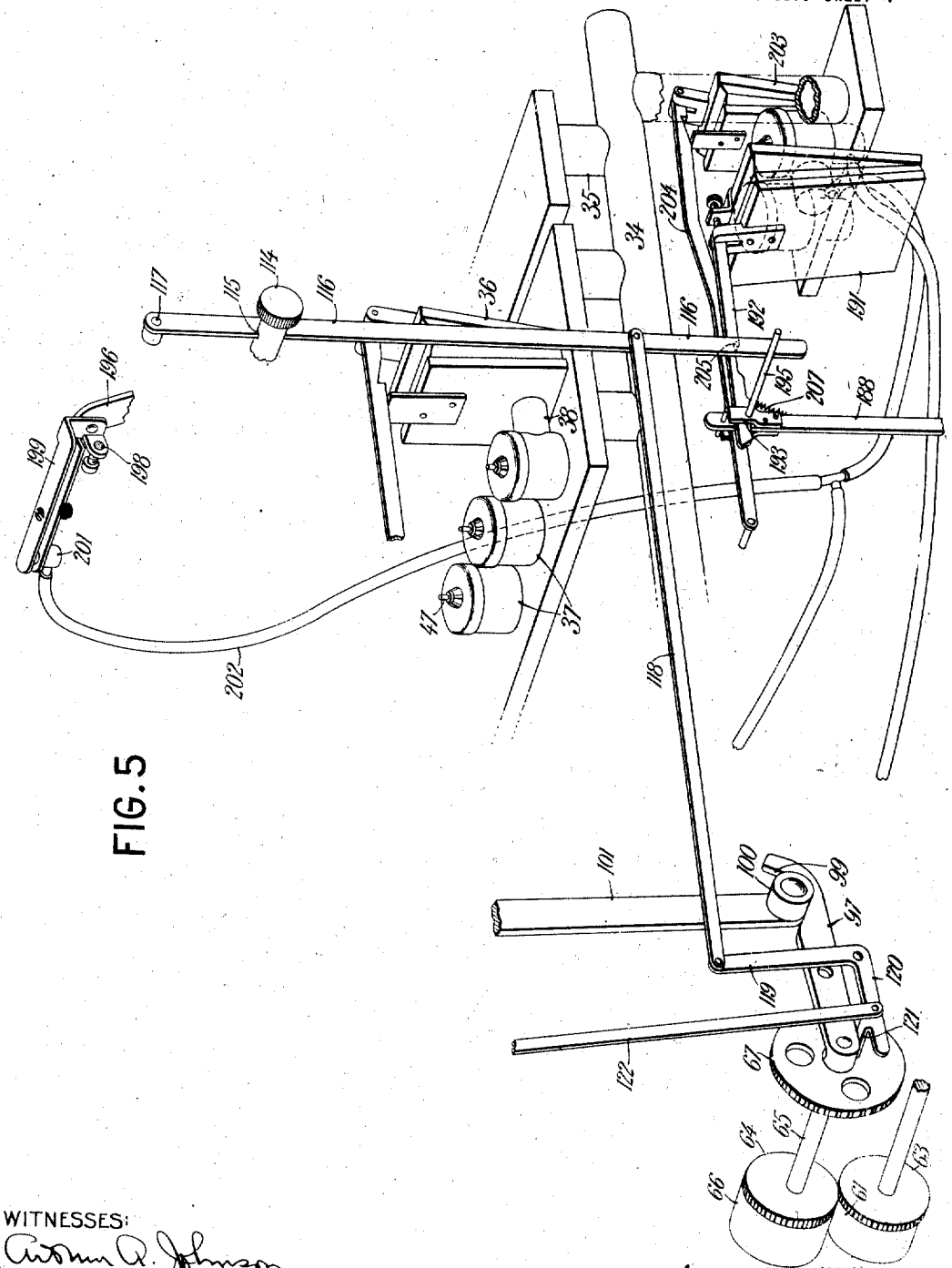

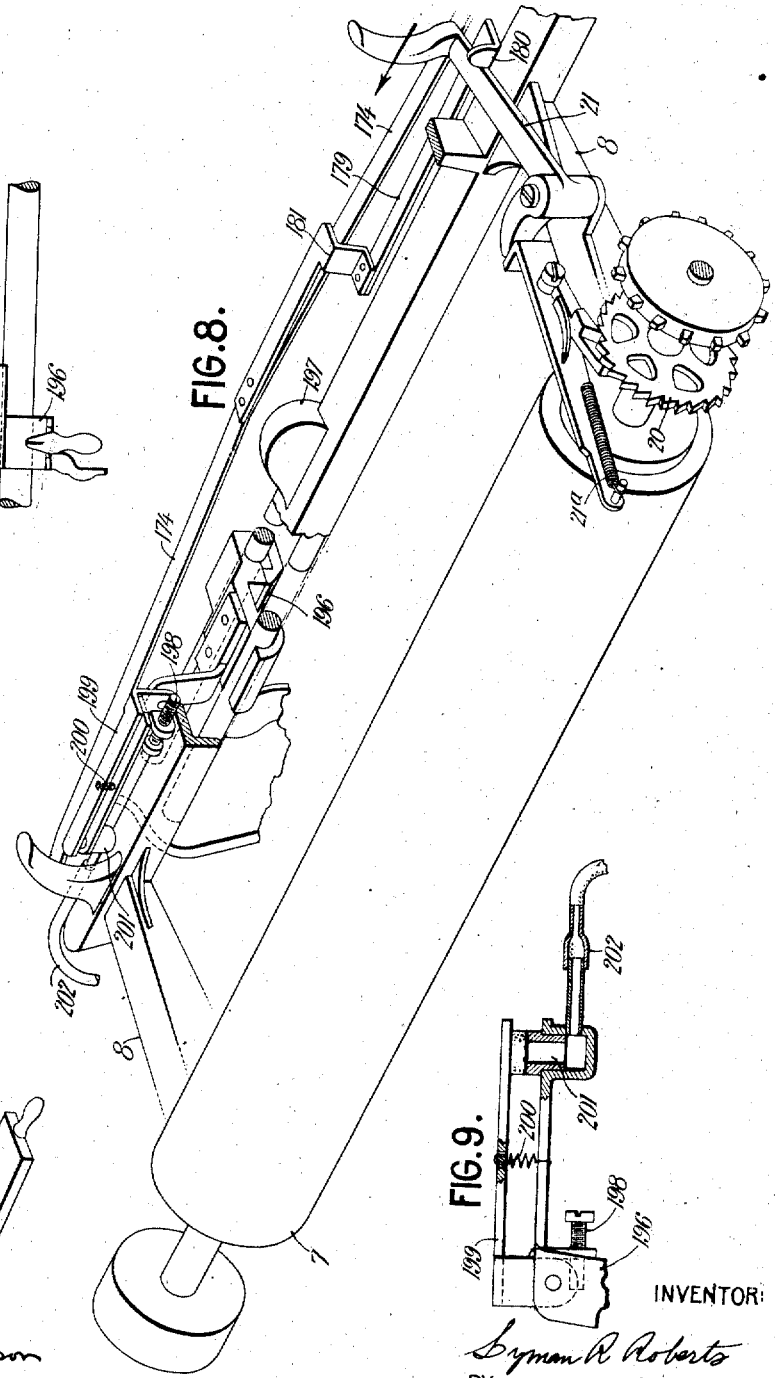

1,252,844.

Patented Jan. 8, 1918.
9 SHEETS—SHEET 6.

WITNESSES:
Arthur A. Johnson
Julius Duckstone

INVENTOR:
Lyman R. Roberts
BY
D. C. Stickney
ATTORNEY.

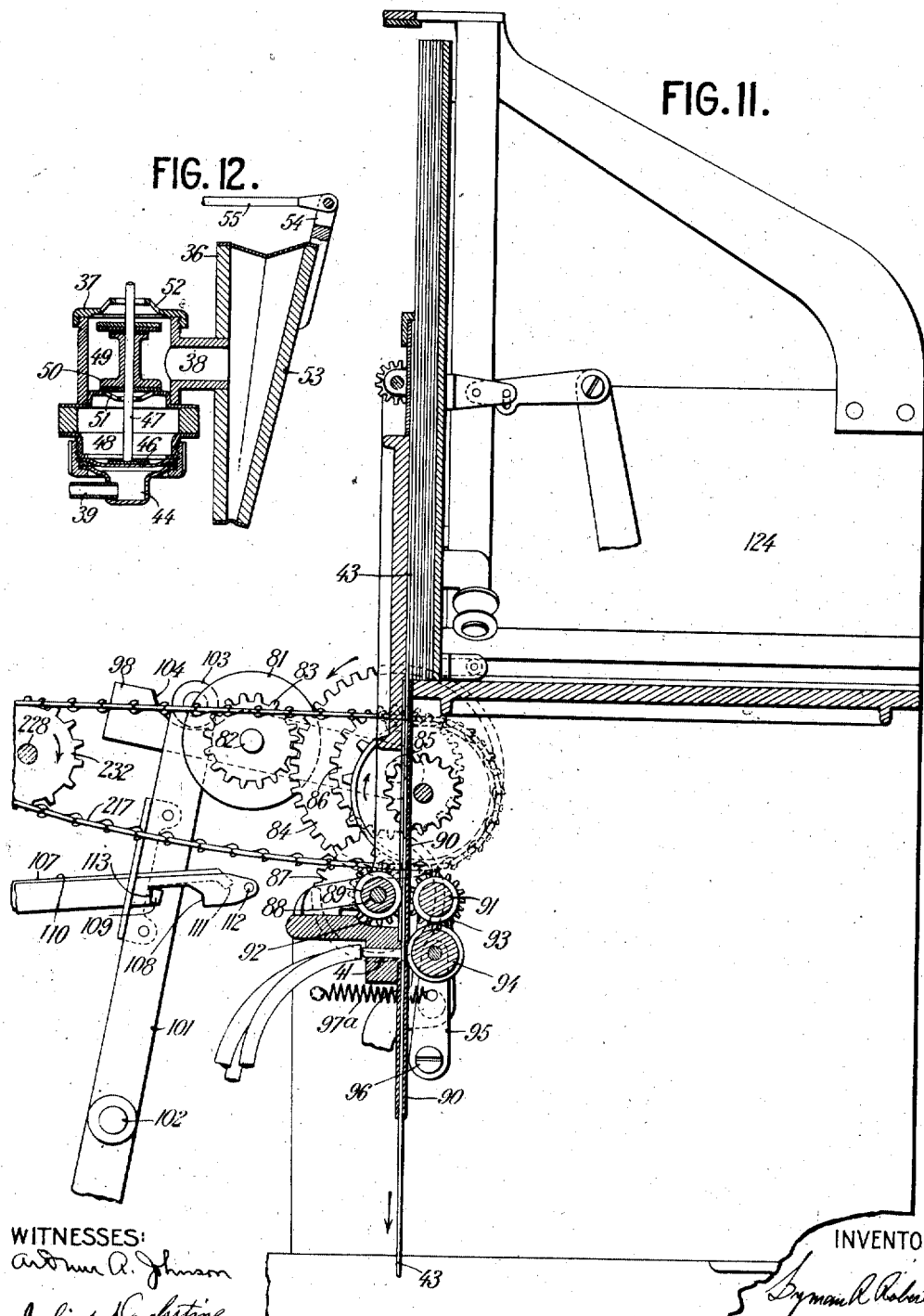

L. R. ROBERTS.
AUTOMATIC TYPE WRITER OPERATOR.
APPLICATION FILED JUNE 6, 1916.

1,252,844.

Patented Jan. 8, 1918.
9 SHEETS—SHEET 8.

WITNESSES:

INVENTOR:
Lyman R. Roberts
BY B. C. Stickney
ATTORNEY.

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER OPERATOR.

1,252,844.  Specification of Letters Patent.  Patented Jan. 8, 1918.

Application filed June 6, 1916. Serial No. 101,881.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Operators, of which the following is a specification.

This invention relates to an improvement in typewriter operators and more especially to the class in which all of the functions of the typewriter can be taken care of automatically, whereby not only one but a dozen machines can be looked after by a single operative, it being merely necessary that the blank paper be supplied thereto in stacks and the typewritten matter removed as accumulated.

This application contains matter divided out of my application, Serial No. 806,408, filed December 13, 1913, patented May 9, 1916, No. 1,182,314.

An object of this invention is to produce a machine which will be simple in construction, compact in its arrangement, and with the operating parts secluded as much as possible and retired from an exposed position.

The machine is of the general type in which the parts are operated by pneumatic actuators, which are controlled by one or more master members passing over tracker boards. In this case two tracker boards are shown, one for writing the body of the matter, such as a letter, and the other for writing inserts, such as a new name and address for each letter. Of course, the inserted matter may also be placed, if desired, even in the midst of the letter, under the control from the second tracker board. The master members are shown of the perforated type, so that when they pass by their tracker boards, they bring perforations successively into register with apertures in the tracker boards in order to admit air to individual controllers, each of which governs the action of a pneumatic actuator. This actuator is connected by mechanical means to the particular part of the typewriter which it is to operate. By this means a successive series of actions of the typewriter may be produced according to any predetermined plan which is governed by the perforations in the master member.

As stated above, in the present case one master member controls the body of the written matter and the other master member controls the inserts. It is therefore essential to shift the control of the operator from one master member to the other. This is controlled by special perforations in each master member, so that they bring into action at proper times, shifting mechanism which enables first one master member to be in ascendency and then the other. In the present instance, where one master member controls the body of the writing, it is desirable to make the same of an endless sheet, so that it can repeat over and over again by passing continually over the tracker board with interruptions mainly for the purpose of allowing the other master member to control the operation of the machine. The other master member in this case is, in fact, a series of individual master members shown in the form of a series of cards perforated to correspond to different inserts, which, in the present case, are different names and addresses.

A feature of the present invention is the provision of means whereby the return of the carriage is obtained by connecting up a special retrieving mechanism therefor in driven relation with a motor, by means of a normally open clutch. This mechanism is so operated that it locks the clutch in its closed position, the unlocking of which takes place when the carriage is returned its full limit as determined by a margin gage, by a valve located on the margin gage and tripped by the carriage, so as to bring into play a pneumatic actuator which releases the locking means.

Other features and advantages will hereinafter appear.

In the accompanying drawings:

Figure 1 is a general view in side elevation of the machine as a whole, with parts omitted for the sake of simplicity and showing, in dotted lines, the path of travel of a completely typewritten sheet in leaving the platen.

Fig. 2 is a skeleton view in side elevation, showing the means for silencing the feed for both tracker boards when the carriage is being returned.

Fig. 3 is a view of the machine as a whole in front elevation, with many parts omitted for the sake of simplicity.

Fig. 4 is a perspective view of the carriage showing the connection to the draw band.

Fig. 5 is a skeleton perspective view, showing the mechanism for controlling the termination of the return movement of the carriage and also the termination of the extent of drive of the platen in bringing a new sheet to the writing point.

Fig. 6 is a top plan view showing a margin gage or stop and its valve control, whereby it go..rns the extent of return movement of the carriage by disconnecting the driving mechanism for the carriage.

Fig. 7 is a detail perspective view of a part of the margin gage shown in Fig. 6.

Fig. 8 is a perspective view showing the carriage with the margin gage having a pneumatic control thereon.

Fig. 9 is a detail of the valve on the margin gage which controls the extent of travel of the carriage or, in other words, controls the stopping of the drive of the carriage in its return movement.

Fig. 11 is a vertical section through the master-card feeding and substituting mechanism.

Fig. 12 is a detail section through one of the pneumatic actuators and the control therefor.

Figure 10:
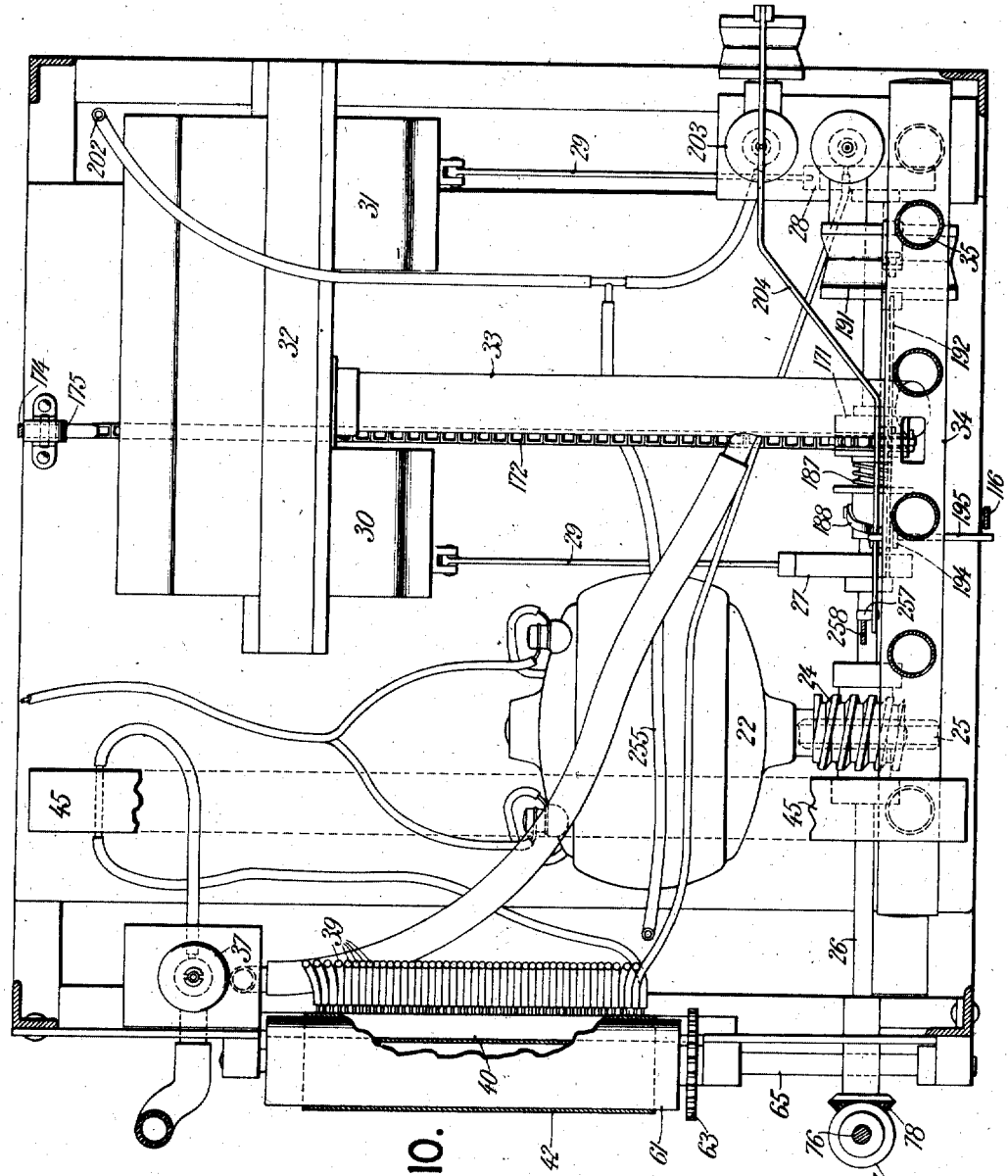
Fig. 10 is a horizontal view in section, on the line 10—10 of Fig. 1, of the lower part of the machine, showing the motor drive and some of the connections to the lower tracker board.
Figure 13:
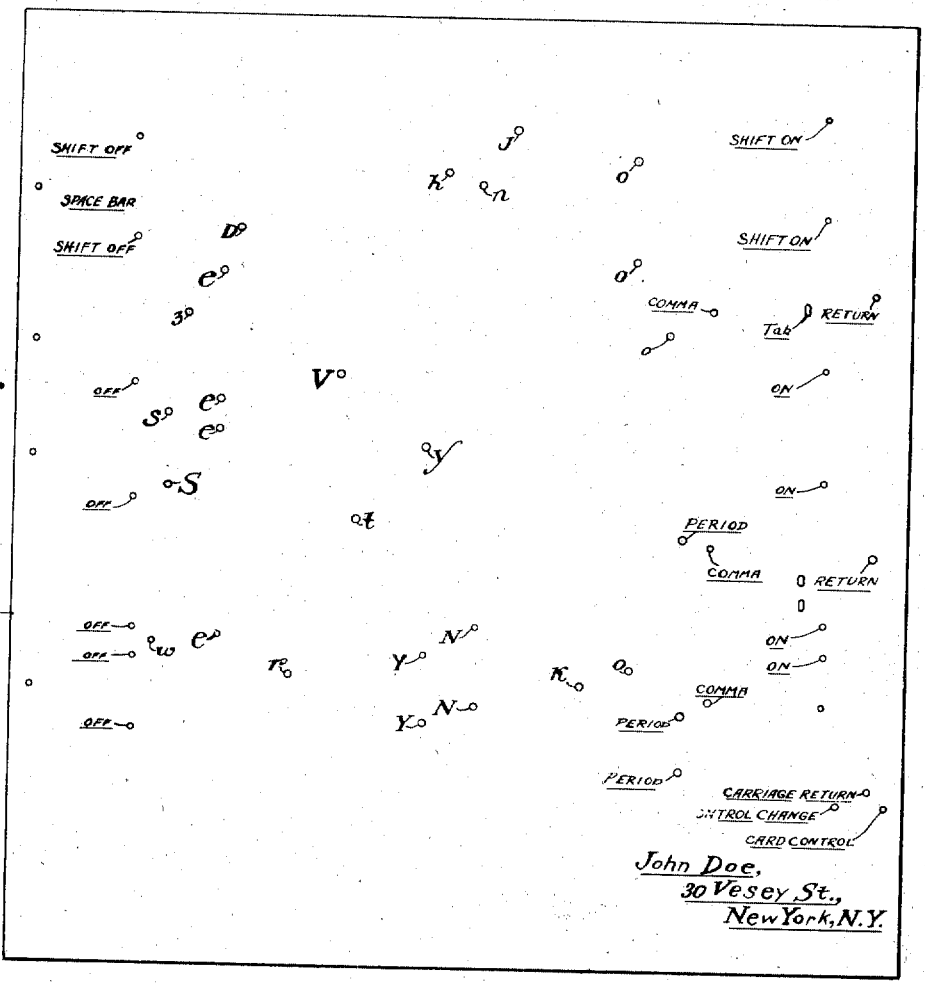
Fig. 13 is a plan view of a master card with the perforations corresponding to the address "John Doe, 30 Vesey street, New York, N. Y."

An operator 1 actuates all of the parts of a typewriter 2 essential to a complete typewriting action.

Considering briefly the parts of the typewriter, which is shown in the present to be an Underwood although any other machine might be used, character keys 3 (Fig. 1) operate levers 4 to rock bell-cranks 5, so as to swing type-bars 6 up rearwardly against the front side of a platen 7 mounted to rotate on a carriage 8, which travels on ways on the frame of the typewriter, under the control of an escapement mechanism indicated in general at 9. This escapement mechanism includes a rack bar 10, pivotally mounted on the frame of the carriage 8, so as to swing into and out of engagement with a pinion 11 connected to rotate with an escapement wheel 12, which is controlled by a pair of dogs 13 actuated by a universal frame 14, which is operated at the actuation of any of the keys, by heels 15 provided on all of the type-bars. The universal frame 14 is mounted for movement on a swinging frame 16. The frame 16 may be operated also by a space key 17, which forms also a part of the type-writing mechanism, and depresses a lever 18 to thrust up an arm 19 provided on the shift frame 16. The platen 7 has the usual line-space wheel 20 (Fig. 8), which is engaged by the usual line-space mechanism including the line-space lever 21, which may be operated by hand or automatically in the manner to be described.

Having thus briefly described the more essential parts of the typewriter a more elaborate and detailed description of the operator therefor may be taken up. The automatic operator for the typewriter has its motive source in an electric motor 22 (Fig. 1), which is provided with a shaft 23 having a worm 24 thereon meshing with a worm wheel 25 to drive the same, so as to drive a shaft 26 on which the worm wheel 25 is secured. The shaft 26 is provided with a pair of eccentrics 27 and 28 arranged in opposite phases on the shaft 26, so as to drive, by means of straps and eccentric rods 29, the two sections 30 and 31 of a bellows vacuum pump. One section will be filling while the other is exhausting, so that a common vacuum chamber 32 therefor will be always under a suction so long as the motor 22 is driving. The suction or vacuum chamber 32 has connected thereto, a main pipe 33, which, by virtue of a feeder 34 and various laterals 35, is arranged to connect with the source of suction, the several pneumatic actuators for the different parts of the hereinafter mentioned vacuum chambers 48 of the mechanism.

Considering specifically the operation of one of these pneumatic actuators, which will serve for all as they act substantially alike, it will be seen by reference to Fig. 12, that each actuator consists of a motor 36 in the form of a collapsible bellows, and a controller 37, which is connected to the motor by a pipe 38. Each controller 37 is connected by tubing 39 to either one or both of a pair of trackers or tracker boards 40 (Fig. 1) and 41 (Fig. 11), according to whether the particular actuator to which the controller corresponds is to be controlled in its action by one or both of the trackers and their master members. That is to say, one of the trackers, take for example, the tracker 40, is used to control the writing of the main portion or body of the matter to be typewritten, and the other, such as the tracker 41, is used to control the writing of the inserts, such as the different names and addresses placed at the top of the several letters.

Figure 15:
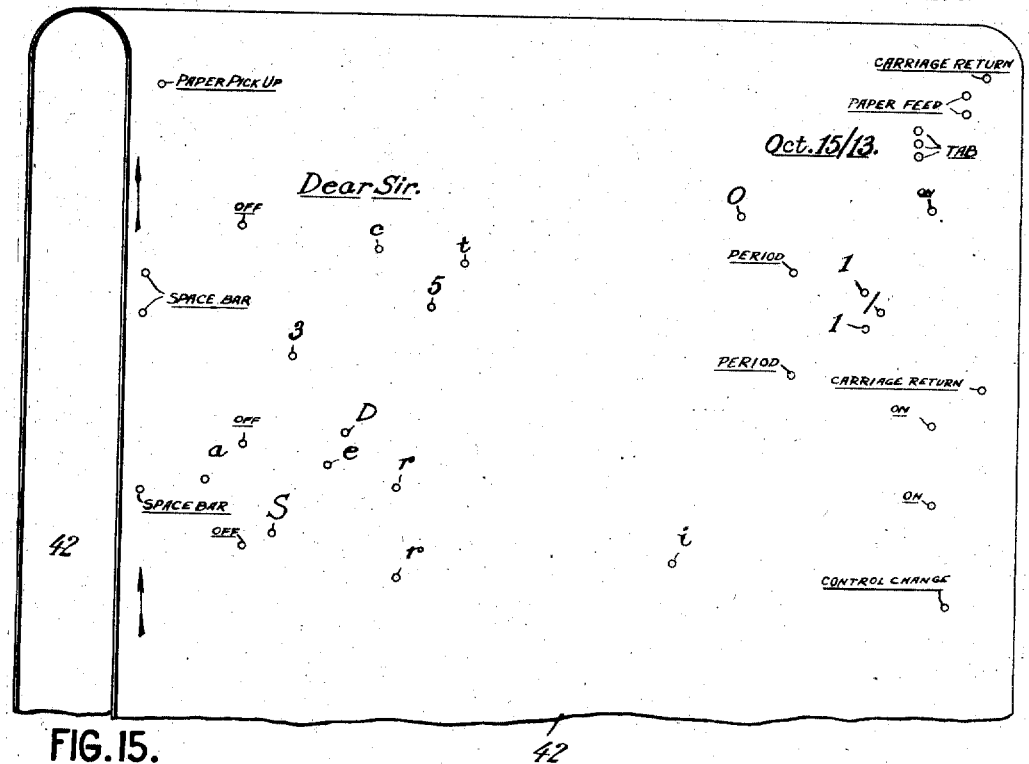
Fig. 15 is a fragmentary perspective view of the master sheet, showing the perforations corresponding to the beginning of a letter, giving the date " Oct. 15/13 " and the salutation.
Figure 16:
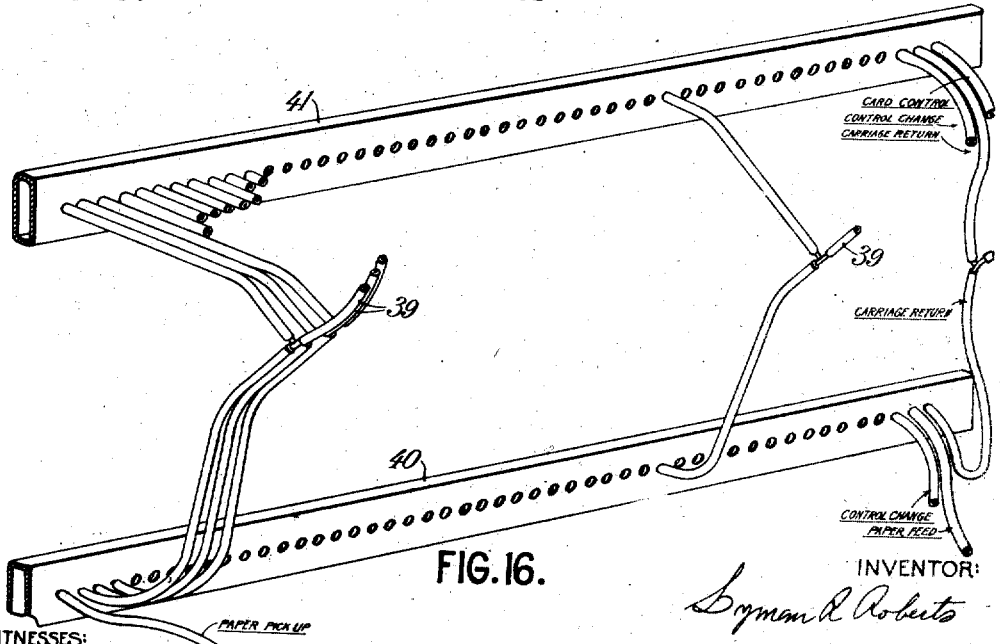
Fig. 16 is a skeleton perspective view showing the two trackers and the branch connections of the tubing thereto, whereby either tracker may control much of the actuating mechanism, such as the actuators for the keys, which must be commonly operated under the control of both the trackers.

In the case of the tracker board 40, the master member which controls the same, is shown in the form of an endless perforated sheet 42 (Figs. 1 and 15), which may be passed repeatedly in front of the tracker 40, as the matter which it controls, such as the body of the letter, is to be repeated over and over again in each new sheet of typewriting. In the case of the upper tracker 41, which controls the writing of the inserts, the master member may, in fact, be several different master members shown in the form of individual perforated cards 43, which are successively brought into coöperation with the tracker 41 to successively control the action thereof.

It is to be understood at this point that the control of the action of the operator 1 is alternately given over entirely first to one tracker board and then to the other. That is to say, the upper tracker 41 will first control the writing of the address, then the control will be shifted to the lower tracker, when the body of the letter will be written; after which, when a new sheet is placed on the typewriter, the control will again be shifted back to the upper tracker to write a new name and address for the new sheet, and so on.

Going back at this point to the particular structure of each actuator and its controller, when one of the master members brings an opening therein into register with an aperture in its tracker board, the particular controller connected thereto by the tubing 39 will have air admitted in a chamber 44. This chamber is normally under a negative or sub-atmospheric pressure, as it is connected with the source of vacuum. This connection is obtained by having each of the tubes or tubings 39 extend through a common suction or bleed chamber 45 (Fig. 1), connected by a lateral with the feeder 34, the portion of each tube within said bleed chamber 45 being provided with a bleed opening 46ª of sufficient size to gradually exhaust the air from the corresponding chamber 44 in the accordant controller 37, but not fast enough to absorb the air admitted through the alined apertures in the master sheet and the tracker in operation. It is thus evident that when air is admitted to the chamber 44 of any particular controller, it will fill the chamber 44 of the controller, raising a diaphragm 46 which forms the top of the chamber, and carrying with this diaphragm, a valve rod 47, which extends upwardly through an intermediate vacuum chamber 48 into an equalizing chamber 49. The chamber 48 is connected, as mentioned above, to the suction pump by the main pipe 33 and the feeder 34 and the laterals 35. This chamber 48 may be common, if desired, to a bank of controllers 37 or individual to each controller.

When the pressure of air admitted to the chamber 44 raises the diaphragm 46 and the valve rod 47 against the weight of the parts and the negative pressure in the vacuum chamber 48, it also raises a valve 50 secured to the valve rod 47. This valve 50 is duplex and first opens a passage 51, forming a means of communication between the vacuum chamber 48 and the equalizing chamber 49, and then closes a passage 52 between the equalizing chamber 49 and the outside atmosphere. That is to say, the valve 50 is double-ended and operates to alternately close and open the passages 51 and 52. When the valve 50 is raised, it connects the equalizing chamber 49 with the vacuum chamber 48, so that air is withdrawn from the equalizing chamber, and this will continue until the valve 50 closes the passage 52, when the air will not only be sucked out of the equalizing chamber 49, but, through the connecting pipe 38, will also be sucked out of the pneumatic bellows motor 36 forming the active part of the actuator. When the air is thus withdrawn from the interior of an actuator, the outside atmospheric pressure causes the same to collapse, so that any part connected to the moving side 53 thereof will be operated.

When the opening in the master sheet passes out of register with the aperture in the tracker board which causes this action, the air will be cut off from the chamber 44, so that the air remaining therein will be sucked out through the bleed opening 46ª until the pressure on both sides of the diaphragm 46 is balanced, causing the weight of the parts to drop the valve 50 to a position closing the passage 51 and opening the passage 52. The bellows motor 36 being cut off from the suction and opened up to atmospheric pressure, will expand and return to its normal condition with the aid of a spreading spring, not shown.

In the case of the actuators which operate the various keys of the typewriter, each one is provided with an arm 54 (Figs. 1 and 3), which is connected by a link 55 to one arm of a bell crank 56. The other arm 57 of each bell crank 56 is provided with a pin 58, which overlies a hook 59 on a link 60 pivoted to the corresponding key of the typewriting mechanism. That is to say, each key is provided with a link 60 having hook 59 underlying one of the pins 58 on one of the bell cranks 56. The arms 57 of the bell cranks are of various lengths and arranged in echelon, so as to avoid one another and coöperate with their corresponding links 60.

Having considered how the pneumatic actuator is constructed and acts, we may now go on to the description of the feeding mechanism for the master members, which control the action of all of the actuators, and how the shift is made from control by one to control by the other at the proper times.

The master sheet 42, which controls the writing of the main part or body of the typewritten matter, such as the body of the letter, passes over a supporting feeding roller 61 (Fig. 1) and is warped across the face of the tracker 40 by means of an idle roller 62 (Fig. 1). The supporting roller 61 is provided with a gear 63, which may be driven at times by a gear 64 secured on a shaft 65, on which is also secured a roller 66. When the master sheet 42 and its tracker 40 are in control, the feeding roller 66 is dropped down to bind the master sheet 42 between its surface and the surface of the supporting roller 61. Under these conditions, the gear 64 will also mesh with the gear 63, so as to drive the same; hence the master sheet will be fed in the direction of the arrow shown in Fig. 1, past the tracker 40, bringing the several perforations therein successively into register with corresponding apertures in the tracker 40.

To drive the shaft 65 and thus the rollers 61 and 66, there is provided on the shaft 65, a gear 67 (Fig. 5), which meshes with a pinion 68 (Fig. 1) secured to a shaft 69 carrying a pulley 70, which is driven by an endless belt 71 from a pulley 72. The pulley 72 is secured to a shaft 73 on which is also secured a friction disk 74 driven by a friction roller 75 bearing against one surface on the disk 74. The friction roller 75 is secured to a shaft 76 driven by a pair of meshing bevel gears 77 and 78, from the cross shaft 26, which, as mentioned above, is driven from the motor 22.

The feeding mechanism for the upper master member is also driven from the shaft 73. For this purpose, there is provided on this shaft, a second pulley 79 (Fig. 1), which is connected, by means of an endless belt 80, to drive a pulley 81 on a shaft 82. The shaft 82 also has secured thereon a pinion 83 meshing with the gear 84 secured on a shaft 85. Also secured on the shaft 85, there is provided a pinion 86, which when lowered (Fig. 11) is arranged to drive a pinion 87 secured on a shaft 88. The shaft 88 has secured thereon a sectional feeding roller 89, the sections of which extend through openings in a guide 90 to engage the upper master card 43 which happens to be in action. A similarly sectioned feeding roller 91 (Fig. 11) passes through openings in the guide 90 and coöperates with the opposite side of the master card 43 in action, so that when the shaft 88 is being driven, the card will be fed down by the coöperation of both the feeding rollers 89 and 91, they being connected to rotate in unison by pinions 92 and 93, secured, respectively, to the feeding roller 89 and the feeding roller 91. A bearing roller 94 corrugated so as to avoid obstructing the openings in the master card 43, holds the master card against the tracker 41, in order to obtain an airtight fit therebetween. This bearing roller is floatingly supported by a frame 95 pivotally mounted at 96, and engaged by a spring 97 which holds the bearing roller 94 to its work. As noted above, however, both master members, that is, the master card and the master sheet, are not in control at the same time. To regulate this change in control, the drive is completed to the feeding mechanism for one master member and interrupted to the feeding mechanism for the other master member, and vice versa. To accomplish this, the shaft 65 for the master sheet 42 is floatingly mounted by a frame including arms 97 (Figs. 1 and 5) pivotally supported on the shaft 69, so as to swing relatively thereto without disturbing the driving connection to the shaft 69. Likewise, the shaft 85 (Figs. 1 and 11) for the master sheet 43 is floatingly mounted by means of a frame including one or more arms 98 pivoted on the shaft 82, so as to swing relatively thereto without interrupting the connection between the gears 83 and 84. One of the arms 97 is provided with a camming socket 99, in which may rest a camming roller 100 secured to the lower end of a shifting lever 101. This shifting lever is pivoted, intermediate its ends, as at 102, and is provided at its upper end with a bearing roller 103 coöperating with a cam socket 104 in one of the upper arms 98.

It will be seen that when the lever 101 is in the position shown in Figs. 1 and 5, the roller-bearing end of the arm 97 will be lowered, so as to permit the roller 66 to drive the master sheet 42, and also permit it to drive the supporting roller 61 through engagement of the gear 64 with the gear 63. This same position of the lever 101, however, as shown in Fig. 1, causes the bearing roller 103 to rest on the dwell portion above the cam socket 104 and thereby hold the gear 86 out of mesh with the gear 87, so that the drive to the feeding rollers 89, 91, is interrupted. On the other hand, when the lever 101 is shifted to the Fig. 11 position, the master card 43 will be in control as the gear 86 is dropped into mesh with the gear 87, completing the drive to the feeding rollers 89, 91, while the shaft 65 and the roller 66 are raised, interrupting the drive between the gear 64 and the gear 63.

In order to manipulate the shifting lever 101

101, a pair of pneumatic actuators 105 and 106 are provided, which are adapted to shift the lever 101 in opposite directions. The actuator 105, which controls the bringing into play of the feeding mechanism for the master sheet 42, is controlled by a perforation in the particular master card 43 in action; while the actuator 106, which controls the bringing into play of the feeding mechanism for the master card 43 is controlled by a perforation in the master sheet 42. In other words, one master member controls the bringing into play of the other master member. As the actuators 105 and 106 are of the type described above and shown in Fig. 12, it is not necessary to redescribe them at this point. Sufficient to say that when the actuator 105 is brought into control by an aperture in the master card 43, it will assume the Fig. 1 condition, whereby a link 107 will, by virtue of a hook or shoulder 108 (Fig. 11) thereon, draw the lever 101 to the the Fig. 1 position, by engagement with a rod or lug 109 on the lever 101, the latter being yieldingly held in this position by a spring detent 101ª, Fig. 1.

Now, when the master sheet 42 has finished its period of control, having completely written the body of a letter, after a new work-sheet has been supplied to the typewriter, then a perforation in the said master sheet 42 comes into register with a corresponding aperture in its tracker 40, so as to cause the pneumatic actuator 106 to collapse its bellows motor. This will bring about a condition in the actuator 106, whereby a thrust link 110 will be plunged forwardly, first causing a cam nose 111 thereon to engage a pin 112 on the link 107, disengaging the shoulder 108 from the lug 109, so as to free the lever 101 from the actuator 105 and its link 107. A further movement of the thrust link 110 causes a shoulder 113 thereon to engage the lug 109 and force the lever 101 from the Fig. 1 position to its Fig. 11 position, whereby the cam roller 103 will drop into the socket 104, permitting the arm 98 to lower the gear 86 into mesh with the gear 87, thereby completing the drive to the feeding rollers 89, 91, so as to feed the master card 43 into position past its tracker 41. At the same time, the lower roller 100 and the lever 101 rock, by a camming action, the arm 97, so as to withdraw the gear 64 from its meshing position with the gear 63, thereby interrupting the drive to the master sheet 42. When the master card thus started into control has been fed to the end of its capacity for control, and has finished writing of a name and address, a perforation therein comes into register with a corresponding aperture in its tracker 41, causing the actuator 105 to come into action. When this takes place, the actuator pulls the link 107 from the Fig. 11 position to a position where the pin 112 engages the end of the nose 111, camming the latter upward, so as to disengage the shoulder 113 from the lug 109. A further movement of the link 107 under the pull of the actuator 105, causes the shoulder 108 on this link to engage the lug 109 and shift the lever 101 back to its original Fig. 1 position; the bellows motor of the actuator 106 in the meantime expanding to the condition shown in Fig. 1 ready for a subsequent action. Under these conditions the feed to the master card 43 will be interrupted and the driving connection to the feeding mechanism of the master sheet 42 completed, so that the control is once more shifted from the master card to the master sheet, enabling the writing of the body of the letter beneath the name and address already written.

It is advisable at times to throw out the feeding mechanisms for both the master card and the master sheet, as when it is necessary to stop the machine or when the carriage is being traversed. In the last case, it would be inadvisable to have keys struck when the work-sheet is in motion. To accomplish this manually, as in stopping the operation of the machine, there is provided a throw-out button 114 (Figs. 1, 2 and 5), which, when the machine is in action, has a groove 115 in register with a shifting bar 116, pivoted at 117. When, however, it is desired to disconnect the drives for both the feeding mechanisms, the manual button is rotated from the Fig. 1 position to shift the bar 116 about its pivot 117 to draw on a link 118, so as to rock the bell crank 119. This bell crank is provided with an arm 120, having an offset 121 (Fig. 5), which underlies the arm 97 supporting the shaft 65 and the roller 66. The arm 120 of the bell crank 119 is also connected by a link 122, to an arm 123 also having an offset underlying the shifting frame or arm 98, which shifts the gear 86 of the driving mechanism for the master card-feeding mechanism.

It will thus be seen that both the arms 97 and 98 will be swung with their gearing-bearing end raised, so as to simultaneously interrupt the drive to both the feeding mechanisms. That is to say, when the button 114 is rotated, it simultaneously interrupts the drive for both master members, so that the machine is silenced. This action is also effected, as will be explained presently, when the carriage is returning to begin a new line.

After one master card has completed its work and shifted the control to the master sheet, it is removed from an effective position and a fresh card from the receptacle 124 put in its place, so that a new name and address can be written on the next work-sheet fed to the platen. This is accomplished in a manner described in my hereinmentioned patent.

Figure 14:
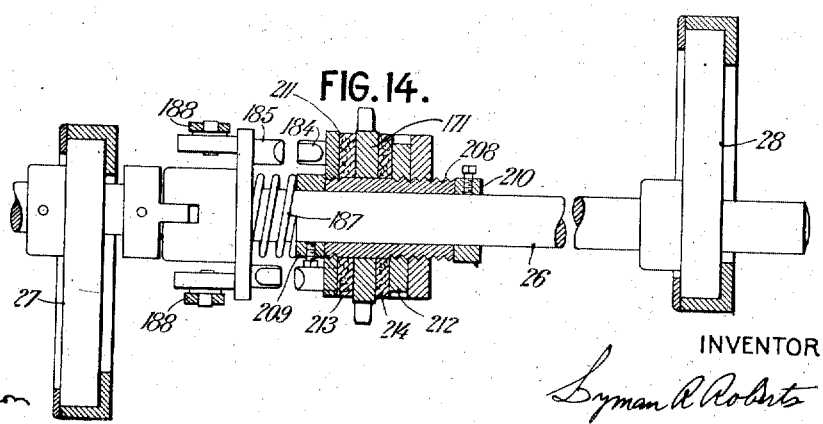
Fig. 14 is a detail section along the main drive shaft, showing the clutch for connecting up the traversing mechanism of the typewriter carriage.

While writing any matter with the typewriter, it is essential to return the typewriter carriage and to line-space the platen at the end of each line so as to enable the beginning of a new line. To enable the automatic operator to perform this function, there is provided on the shaft 26, which, as stated above, is driven from the motor 22, a sprocket 171 (Figs. 1 and 14). This sprocket is not fixed on the shaft 26, but is connectible thereto, so as to be driven thereby, and thus drive an open stretch of sprocket chain 172, which is flexibly connected, as by one or more springs 173, to a draw-band 174 (Figs. 1, 3 and 8). This draw-band forms with the chain, a complete endless traversing member, which passes over one or more guiding rollers 175 on the operator frame and also over guiding rollers 176, 177 on the typewriting machine frame. These last rollers may be offset considerably from the typewriter frame, by brackets 178, to give the necessary reach in traversing the typewriter carriage 8.

The draw-band 174 has secured thereto a connector 179, which is provided with a hook 180 to engage the line-space lever 21, so as to space the platen as well as return the carriage when the draw-band is traversed in a clockwise direction, as in Fig. 4. The backward movement of the draw-band 174 relatively to the carriage 8, is limited by a shoulder 181 formed by a bend in the connector 179, which shoulder engages a shoulder 182 provided on a guide 183, through which guide the band 174 extends and which is secured on the typewriter carriage 8. The normal spring 21ª (Fig. 8) of the line-space mechanism of course acts when the traction on the draw-band 174 is released, to return the connector 179 and the parts joined thereto to the positions shown in Fig. 4.

In order to connect the sprocket wheel 171 in driven relation with the shaft 26, there is provided a clutch element 184 (Figs. 1 and 14), which is secured to the sprocket 171 in any suitable manner, such as that shown in Fig. 14. A second clutch element 185 is splined on the shaft 26 and shiftable against the tension of a spring 187, which normally holds it out of engagement with the clutch element 184, into engagement therewith, so as to complete the driving connection between the sprocket 171 and the shaft 26.

To move the clutch element 185 against the tension of the spring 187, there is provided a clutch shifter 188, pivoted at 189, and limited in its movement, owing to the impulse of the spring 187, by an adjustable stop 190. The clutch shifter 188 is operable by a pneumatic actuator 191 under the control of either the master card or the master sheet according to which is in action. That is to say, when the end of a line of typewriting is reached, a carriage-return perforation in the master member in control, will come into opposition with an aperture in the corresponding tracker, exciting the pneumatic actuator 191 to operation in the usual way, so that the bellows motor thereof will collapse, drawing on a link 192 (Figs. 1 and 5), which extends through a guide 193 in the shifter 188, and is provided with a notch 194 having teeth on either side thereof, so that the link 192 can settle over a pin 195 provided on the shifter 188. Thus, when the bellows motor of the actuator collapses, it draws on the link 192 to rock the shifter 188 to the right (Fig. 1), so as to close the clutch comprising the elements 184 and 185 and thus connects the sprocket 171 in driven relation with the shaft 26, thereby enabling the return of the carriage and the line-spacing of the platen by means of the draw-band 174.

It will be noted in passing that the movement of this shifter 188, to cause a return movement of the carriage, also disconnects the drive to both the feeding mechanisms of the master control sets, so that whichever one is in action will be silenced until the carriage is completely returned, thus preventing any typewriting action of the keys while the work-sheet is moving. This is accomplished by the pin 195, which is extended to engage the bar 116 (Figs. 1 and 5), whereby the link 118 will be drawn on to lift both sets of the gear-bearing frames or arms 97 and 98. Of course this stopping of the master sheet in action leaves the perforation which caused the collapsing of the bellows motor of the actuator 191, in register with the aperture in the tracker, thereby maintaining this actuator in action until the carriage has been completely returned. That is to say, the drive from the shaft 26 and thus from the motor, is maintained until the carriage reaches the limit of its return movement. The limit of this return movement is determined by a margin gage 196, which is adjustably mounted on the typewriter frame.

As the carriage 8 of the typewriter approaches the end of its return movement, a trip 197 comes into engagement with an adjustable stop 198, (Figs. 4, 5, 6, 8 and 9), which is secured to a valve 199 pivotally mounted on the margin gage 196. This valve is normally held in its closed position by a spring 200, so as to prevent air leaking into a controlling tap 201. When, however, the carriage reaches the limit of its movement, it rocks the valve 199, admitting air to the tap 201 and thus to tubing 202 connected thereto. This tubing is connected to the control of a pneumatic actuator 203, so that the latter will come into action at this time. When the pneumatic motor of this pneumatic actuator 203 is collapsed, it forces a plunger 204 (Figs. 1 and 5) forwardly, so that the latter, through the intermediary of a pin 205 carried thereby, engages a cam surface 206 on the link 192 and raises the same against the tension of a spring 207, so as to withdraw the notch 194 of the link 192 from engagement with the pin 195. When the link 192 is thus disconnected from the shifter 188, the spring 187 is free to act, forcing the clutch element 185 away from the clutch element 184, and disconnecting the sprocket 171 from driven relation with the shaft 26. The return of the shifting lever 188 also permits the return of the bar 116, and thus allows the particular feeding mechanism which was in action before the carriage started to return, to come into action once more, so as to drive its master member to advance the carriage-return perforation and bring the next perforation into register with its proper aperture in the accordant tracker board.

In Fig. 14, it will be seen that the sprocket 171 is mounted loosely on a sleeve 208 mounted loosely on the shaft 26 between collars 209 and 210. The sprocket 171 is merely frictionally connected to a disk 211 bearing the clutch element 184, so that it may have a certain amount of slippage relatively to the clutch, to take up any jar in suddenly connecting the clutch in driven relation with the shaft 26, and also to prevent the breakage of any of the parts in case the carriage reaches the limit of its return stroke before the clutch element 185 is disconnected from the clutch element 184. To obtain this lost motion and yet positive connection, the sprocket 171 is clamped between the disk 211 and a disk 212, with a pair of friction washers 213 and 214, one on either side of the sprocket 171, the sleeve 208 being screwthreaded at its ends to coöperate with corresponding screw-threads on the disk 211 and the disk 212.

The blank sheets are deposited in a stack in an openfaced receptacle 275, from which they are automatically taken, one at a time, by a sheet-lifter 283 and dropped into a chute 320 whence they are fed to the printing line as described in my herein-mentioned patent.

If the machine were to be stopped by the hand button 114 when a carriage-return perforation in either master member was in register with its aperture in the corresponding tracker board, then when the machine is started up again a false carriage return might take place. To avoid this possibility, the bar 116 (Figs. 1 and 2) is provided with an extension 333 having a hook 334 to engage the inclined end of the link 192. The hook 334 moves with the bar 116 when the latter is cammed to its actuated position by the button 114, so that the link 192 will be raised clear of the pin 195 on the shifting lever 188. Thus, if air should be admitted to the actuator 191, the latter would operate without shifting the lever 188, so that the carriage return mechanism will not be brought into play. After the mechanism started in action, the perforation in the master sheet would naturally pass away from its actuator, so that the actuator 191 would resume its normal condition. The action of the actuator 191 would, of course, take place, if it happened at all, immediately before the link 192 has had time to drop into engagement with the pin 195.

In considering the operation of the device, it will be assumed that a letter has been completely written on a work-sheet on the platen and we are about to repeat this letter with a new name and address. The master sheet 42 (Figs. 1 and 15) is in control and the feeding mechanism therefor in operation, while the feeding mechanism for the master card is silent and a blank or solid portion of the master card in place is opposite to the apertures in the tracker 41. As the master sheet 42 is fed past its tracker 40, it brings a perforation into register with a corresponding aperture in the tracker 40, which controls the operation of the pneumatic actuator 191, whereby the clutch-shifting lever 188 will be operated to bring the clutch element 185 into engagement with the clutch element 184, so as to enable a carriage-return movement. This is to insure the carriage being at the end of its return movement in a position to receive a new work-sheet from the sheet-feeding mechanism.

When the carriage-return mechanism comes into play it automatically raises the gear 64 out of mesh with the gear 63 through the intermediary of the bar 116, the link 118 and the arm 120 (Figs. 2 and 5), so that the drive to the master sheet is silenced. When, however, the carriage reaches the end of its return movement, the trip thereon engages the stop 198 and opens the valve 199, so as to excite to action the pneumatic actuator 203, whereby the link 192 will be tripped to permit the unclutching of the sprocket wheel 171 from the shaft 26, thereby interrupting the drive to the carriage-return mechanism. This will permit the bar 116 to return to its normal position, thereby permitting the gear 64 to drop into mesh with the gear 63, continuing the feed of the master sheet. The master sheet will thus be moved along to bring two new perforations into play, one corresponding to the rotation of the platen so as to remove the work-sheet already on the platen, and the other corresponding to the picking up of a fresh sheet of paper by the sheet-lifter 283.

Variations may be resorted to within the scope of the invention, and portions of the improvements may be used without others.

Having thus described my invention, I claim:

1. The combination with a typewriting mechanism including a traveling carriage, of a pneumatic actuator for starting the return movement of said carriage, and a separate pneumatic actuator for ending the return movement of said carriage, said first-mentioned actuator remaining in play after said second-mentioned actuator has come into play.

2. The combination with a typewriting mechanism including a traveling carriage, of a pneumatic actuator for controlling the movement of said carriage, a margin gage for said carriage, and a valve on said gage and operated from said carriage for controlling the action of said pneumatic actuator.

3. The combination with a typewriting mechanism including a traveling carriage, of a pneumatic actuator for controlling the movement of said carriage, a margin gage for said carriage, and a valve on said margin gage and operated from said carriage for controlling the action of said pneumatic actuator, said margin gage and said valve being adjustable to vary the instant of operation of said actuator.

4. The combination with a traveling carriage, of an endless connection for traversing said carriage including a sprocket chain, a sprocket wheel for driving said chain, a shaft for driving said sprocket wheel, a normally open clutch for forming a connection between said sprocket wheel and said shaft, and means for closing said clutch.

5. The combination with a traveling carriage, of an endless connection for traversing said carriage including a sprocket chain, a sprocket wheel for driving said chain, a shaft for driving said sprocket wheel, a normally open clutch for forming a connection between said sprocket wheel and said shaft, means for closing said clutch, and means for releasing said closing means at a predetermined point in the travel of said carriage.

6. The combination with a traveling carriage, of a connection for traversing said carriage, a normally silent member for driving said connection, a clutch for enabling the drive of said silent member, a shifter for said clutch, an actuator for operating said shifter, a link connecting said actuator to said shifter, and means for tripping said link from said shifter after a predetermined movement of said carriage.

7. The combination with a traveling carriage, of a connection for traversing said carriage, a normally silent member for driving said connection, a clutch for enabling the drive of said silent member, a shifter for said clutch, an actuator for operating said shifter, a link connecting said actuator to said shifter, and an actuator controlled from said carriage for tripping said link from said shifter after a predetermined movement of said carriage so as to silence said drive to said carriage.

8. The combination with a typewriting mechanism including a traveling carriage, of an endless connection for traversing said carriage said connection including a spring and a sprocket chain, a sprocket wheel for driving said chain, and means for controlling the drive of said sprocket wheel.

9. The combination with a traveling carriage, of an endless connection for traversing said carriage, said connection including a draw-band, a sprocket chain connected to said draw-band and a spring forming a yielding link in said connection, a sprocket wheel for driving said draw-band by engagement with said sprocket chain, and a normally open clutch for controlling the drive of said sprocket wheel.

10. The combination with a traveling carriage, of a connection for traversing said carriage, shifting mechanism for controlling the action of said connection, a pneumatic actuator for operating said shifting mechanism, a link connecting said pneumatic actuator with said shifting mechanism, means for interrupting the connection of said link with said shifting mechanism to stop the traveling movement of said carriage, and means for interrupting the connection of said link with said shifting mechanism to prevent a traveling movement of said carriage.

11. The combination with a traveling carriage, of traversing means for said carriage, a sprocket for driving said traversing means, a shaft for driving said sprocket, a motor for driving said shaft, said sprocket being normally loosely mounted on said shaft, a clutch for connecting said sprocket in driven relation with said shaft, a pneumatic actuator closing said clutch, and a master control set for governing the action of said actuator.

LYMAN R. ROBERTS.

Witnesses:
EDITH B. LIBBEY,
GEO. J. KUNEY.

Correction in Letters Patent No. 1,252,844.

It is hereby certified that the grant in Letters Patent No. 1,252,844, granted January 8, 1918, upon the application of Lyman R. Roberts, of Rutherford, New Jersey, for an improvement in "Automatic Type-Writer Operators," shows Letters Patent to have issued to the inventor, said Roberts, whereas said patent should have issued to *Underwood Typewriter Company, of New York, N. Y., a corporation of Delaware,* said corporation being owner of the entire interest in said invention, as shown by the records of assignments in this office; and that the said Letters Patent should be read with this correction therein that the same may conform to the record of the case in the Patent Office.

Signed and sealed this 12th day of February, A. D., 1918.

[SEAL.]

J. T. NEWTON,

*Commissioner of Patents*

Cl. 197—20.